United States Patent
Teichmann

(10) Patent No.: US 8,987,926 B2
(45) Date of Patent: Mar. 24, 2015

(54) SYSTEMS AND METHODS FOR VARIABLE SPEED OPERATION OF COMBUSTION ENGINES

(71) Applicant: General Electric Company, Schenectady, NY (US)

(72) Inventor: Ralph Teichmann, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 13/801,890

(22) Filed: Mar. 13, 2013

(65) Prior Publication Data

US 2014/0265327 A1    Sep. 18, 2014

(51) Int. Cl.
*F02N 11/04* (2006.01)
*H02K 23/52* (2006.01)
*H02P 9/04* (2006.01)
*H02P 9/08* (2006.01)
*F01D 15/10* (2006.01)

(52) U.S. Cl.
CPC *H02P 9/08* (2013.01); *F01D 15/10* (2013.01); *H02P 9/04* (2013.01); *F05D 2260/85* (2013.01)
USPC .......................................................... 290/31

(58) Field of Classification Search
CPC .............. H02P 9/08; H02P 9/04; F01D 15/10; F05D 2260/85
USPC .............................. 290/31, 17, 21, 51; 322/29
See application file for complete search history.

(56) References Cited

U.S. PATENT DOCUMENTS

| 6,333,622 | B1 | 12/2001 | Fogarty et al. |
| 7,466,109 | B1 | 12/2008 | Larsen et al. |
| 2005/0116689 | A1 | 6/2005 | Fogarty et al. |
| 2010/0019496 | A1 | 1/2010 | Yu |
| 2012/0059555 | A1* | 3/2012 | Bixel et al. ............... 701/50 |

FOREIGN PATENT DOCUMENTS

DE    10 2007 005 165 A1    8/2007
EP         1 553 275 A2    7/2005

OTHER PUBLICATIONS

European Search Report and Written Opinion issued in connection with corresponding EP Application No. 14157658.7 on Jun. 27, 2014.

* cited by examiner

*Primary Examiner* — Javaid Nasri
(74) *Attorney, Agent, or Firm* — Sutherland Asbill & Brennan LLP

(57) ABSTRACT

Certain embodiments of the disclosure may include systems and methods for variable speed operation of combustion engines. According to an example embodiment of the disclosure, a method is provided for controlling the operation of the combustion engine. The method can include providing power from a power source to a converter; providing frequency variable power to a generator from the converter; accelerating the generator and associated turbine to a predetermined speed by modulating the frequency variable power from the converter; after a predetermined turbine speed is achieved, disconnecting power supplied to the generator by the converter; and modulating the subsequent operation of the generator using power from the converter.

19 Claims, 4 Drawing Sheets

SYSTEMS AND METHODS FOR VARIABLE SPEED OPERATION OF COMBUSTION ENGINES

TECHNICAL FIELD

This disclosure generally relates to power generation systems and in particular to systems and methods for variable speed operation of combustion engines.

BACKGROUND

Combustion engine systems are configured to operate at a determined power output and efficiency. Increasing the operational flexibility of a combustion engine can be achieved by varying the combustion engine's speed for any given power output. Varying the combustion engine's speed can include a starting means for initiating engine operation or a controlling means for operating the combustion engine in a running mode. Effectively varying the combustion engine's speed during a starting or running mode can result in decreased maintenance costs, improved starting performance, prolonged engine life, higher efficiencies, and fewer emissions.

BRIEF DESCRIPTION OF THE DISCLOSURE

Some or all of the above needs may be addressed by certain embodiments of the disclosure. Certain embodiments of the disclosure may include systems and methods for variable speed operation of combustion engines. According to an example embodiment of the disclosure, a method for partial variable speed operation of a combustion engine can be provided. The method can include providing power from a power grid or an auxiliary power source to a converter; providing frequency variable power to a generator from the converter; accelerating the generator and associated turbine to a predetermined speed by modulating the frequency variable power from the converter; after a predetermined turbine speed is achieved, disconnecting the power supplied to the generator by the converter, while the turbine continues to accelerate the generator; and after the generator has reached nominal speed, reconnecting the converter such that the modulating speed in the subsequent operation of the generator is using power from the converter.

In certain embodiments, the method can also include firing the engine to start generating power and continue to run up the generator to nominal speed. The method can also include modulating the generator and combustion engine speed around its nominal speed using the same converter once the combustion engine has reached its nominal operating speed.

As the system accelerates and reaches the nominal operating speed range set by the power grid frequency and the generator design, the same converter used to accelerate the system from standstill can provide for partial variable speed operation of a combustion engine within a pre-defined tolerance range of the nominal speed. The generator-converter arrangement can be reconfigured with respect to power flow direction and operation of the generator.

According to another embodiment, the system can include an auxiliary power source operable to provide power; a converter operable to receive power from the power source and to provide frequency variable power; a generator operable to receive frequency variable power from the converter, wherein the frequency variable power accelerates the generator and an associated turbine to a predetermined speed; wherein the converter is disconnected from the generator and associated turbine when the predetermined speed is reached; and a computer processor operable to modulate the operation of the converter.

According to yet another embodiment, one or more computer-readable media can be provided. The computer-readable media can store computer-executable instructions that, when executed by at least one processor, configure the at least one processor to perform certain operations. The operation can include providing power from a power source to a converter; providing frequency variable power to a generator from the converter; accelerating the generator and associated turbine to a predetermined speed by modulating the frequency variable power from the converter; after a predetermined turbine speed is achieved, disconnecting the power supplied to the generator by the converter; and modulating the subsequent operation of the generator using the power from the converter.

Other embodiments, features, and aspects of the disclosure are described in detail herein and are considered a part of the claimed disclosure. Other embodiments, features, and aspects can be understood with reference to the following detailed description, accompanying drawings and claims.

BRIEF DESCRIPTION OF THE FIGURES

References will now be made to the accompanying figures and flowchart diagrams, which are not necessarily drawn to scale, and wherein.

DETAILED DESCRIPTION OF THE DISCLOSURE

Example embodiments of the disclosure now will be described more fully hereinafter with reference to the accompanying drawings, in which some, but not all embodiments are shown. Indeed, the disclosure may be embodied in many different forms and should not be construed as limited to the embodiments set forth herein; rather these embodiments are provided so that this disclosure will satisfy applicable legal requirements. Like numbers refer to like elements throughout.

According to an example embodiment of the disclosure, the power output of a combustion engine can be maintained by varying the speed of the combustion engine. Varying the combustion engine speed may increase the operational flexibility of the combustion engine. This flexibility can improve the combustion engine reliability by decoupling transient grid conditions from the mechanical system as well as optimizing firing patterns under different load conditions. Certain technical effects or solutions can be accomplished by certain embodiments of the disclosure, for example, the combustion engine speed can be varied by using a computer processor with one or more executable instructions to control the power conversion signal sent to the system's generator. In certain instances, the technical effect or solution of starting the combustion engine can be accomplished by an auxiliary power unit (APU), wherein power from the APU can be controlled with a computer processor. When the combustion engine transitions from starting mode to running mode, the computer processor can monitor and respond to the operating parameter inputs received from the engine sensors. Further, in certain embodiments, technical effects including a substantial operational impact on the combustion engine performance can be achieved by modulating the generator speed within a percentage range of the nominal generator speed range. This device, connected at the grid and the generator, is controlling the generator speed resulting in a change in combustion engine speed via a mechanical coupling.

Figure 1:
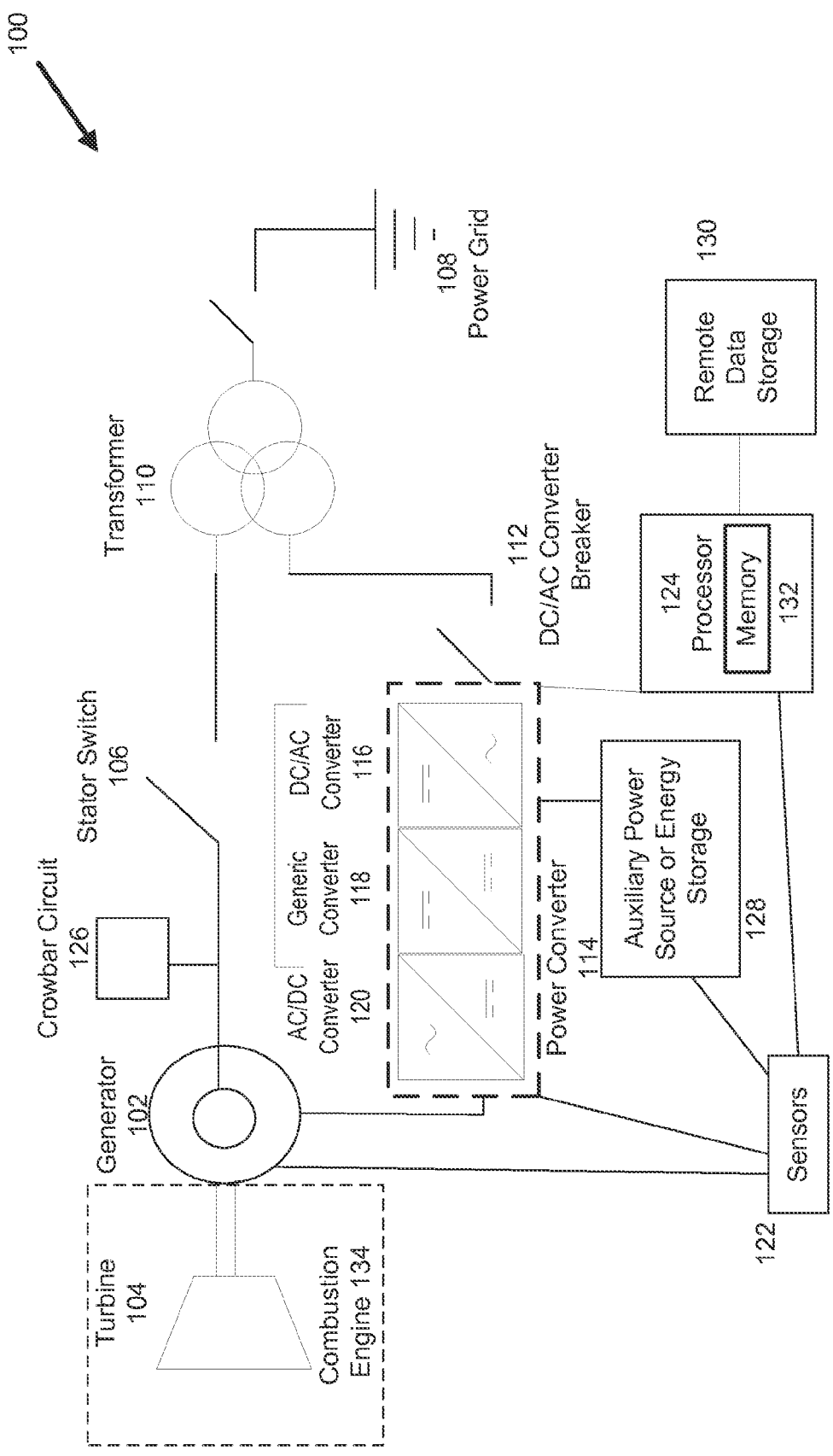
FIG. 1 is a schematic diagram of an example system according to an example embodiment.

Referring to the drawings, FIG. 1 is a schematic view of an example system 100. In the illustrated embodiment, the system 100 can include a generator 102 connected to an associated turbine 104 being a part of a combustion engine 134. The embodiment in FIG. 1 can be configured to initiate system start-up with the stator side circuit of the generator 102 set to an open circuit; wherein the stator switch 106 can be set to the open position. During a normal starting mode, power to start the generator 102 can be provided by a power grid 108. The power can be provided through a transformer 110 as alternating current (AC). The AC can flow through the DC/AC converter breaker 112, which can be set to the closed position. The AC can flow through a series of components in a power converter 114. The AC from the power grid 108 can be converted to direct current (DC) at the AC/DC converter 116. The power signal can pass through a DC to DC link 118. The subsequent DC signal can then be converted back to an AC signal of variable frequency at the AC/DC converter 120. This AC signal can be provided to the rotor side of the generator 102. In this operation of the engine starting sequence, the generator 102 can act as a motor. While in the motoring phase, the generator 102 can turn the associated turbine 104 to reach a suitable firing speed for the turbine 104. The crowbar circuit 126 should be closed for this mode of operation.

During operation, the combustion engine system 100 can be monitored with sensors 122 and controlled by a processor 124. Once the firing speed is reached, the processor 124 can send a controlling signal to the power converter 114. The controlling signal can remove the power output to the rotor, subsequently demagnetizing the rotor of the generator 102. Once the rotor is fully demagnetized, the crowbar circuit 126 can be opened leaving the generator 102 fully in idle mode.

At this operation, the combustion engine can transition from starting mode to running mode; wherein the associated turbine 104 is further accelerated to nominal speed driven by its internal combustion process. At that point, the combustion engine 134 can provide mechanical energy to turn the generator 102. The generator 102 can switch from motoring mode to power generating mode. A crowbar circuit 126 electrically connected to the stator side of the generator 102 should be set to an open position. The stator switch 106 can be closed, which can allow power to flow through the closed stator switch 106 to the transformer 110. The transformer 110 can adjust the power for use in the power grid 108. The power converter 114 is now providing the speed modulation capability around its nominal speed desired to improve operational performance. The DC/AC converter breaker 112 remains closed during this mode of operation providing the capability of controlling the power flow through the power converter 114. By injecting the variable frequency AC voltage provided by AC/DC converter 120 of the power converter 114, the generator's speed can be perturbed around its nominal speed within a tolerance range given by the maximum power rating of the power converter 114.

For an embodiment that uses a black-start starting mode, the power grid 108 may not provide the power necessary to initiate the rotation of the rotor in the generator 102. Starting power can be provided by an auxiliary power source (APU) 128 or other energy storage source. The processor 124 can provide a signal to the APU 128, and the APU 128 can provide sufficient power to the power converter 114. The power converter 114 can then transfer the necessary power to initiate the rotor of the generator 102.

In this embodiment, the use of a crowbar circuit 126 may, in certain instances, be functionally necessary for the generator 102 to create an electro-motive force during the starting mode. The crowbar circuit 126 may be a mechanical or electrical component. An embodiment using a mechanical-type crowbar, similar in functionality to the crowbar circuit 126, may use a physical circuit breaker. Further, an embodiment using an electrical-type crowbar may use a thyristor. Other embodiments may be used to serve a similar purpose as the crowbar circuit 126. For example, the crowbar circuit 126 could be integrated as a component of the power converter 114.

The APU 128, as shown in FIG. 1, can include, but is not limited to, a diesel generator, a fuel cell, an ultra-capacitor or a battery. An embodiment that uses electro-chemical storage elements like batteries, fuel cells, or ultra-capacitors such as an APU 128 may employ a power converter 114 that is bidirectional. An embodiment that employs a bidirectional power converter 114 may allow for an APU 128 to receive power from the generator 102 to replenish energy expended during a black-start starting mode.

The computer processor 124 shown in FIG. 1 can be operable to communicate with a remote data storage device 130 and/or a memory 132 to execute one or more computer-executable instructions operable to control the signal sent to the power converter 114. In one embodiment, the processor 124 can send a signal varying in frequency and voltage to adjust the output of the generator 102 to provide consistent power. In the embodiment shown, the power output can be provided to a power grid 108. The controlling signal from the processor 124 can be determined from one or more diagnostic parameter inputs received from a plurality of sensors 122. The sensors 122 can be configured to receive multiple types of parameter data that can include, but is not limited to, engine speed, engine efficiency, and engine emissions.

Figure 2:
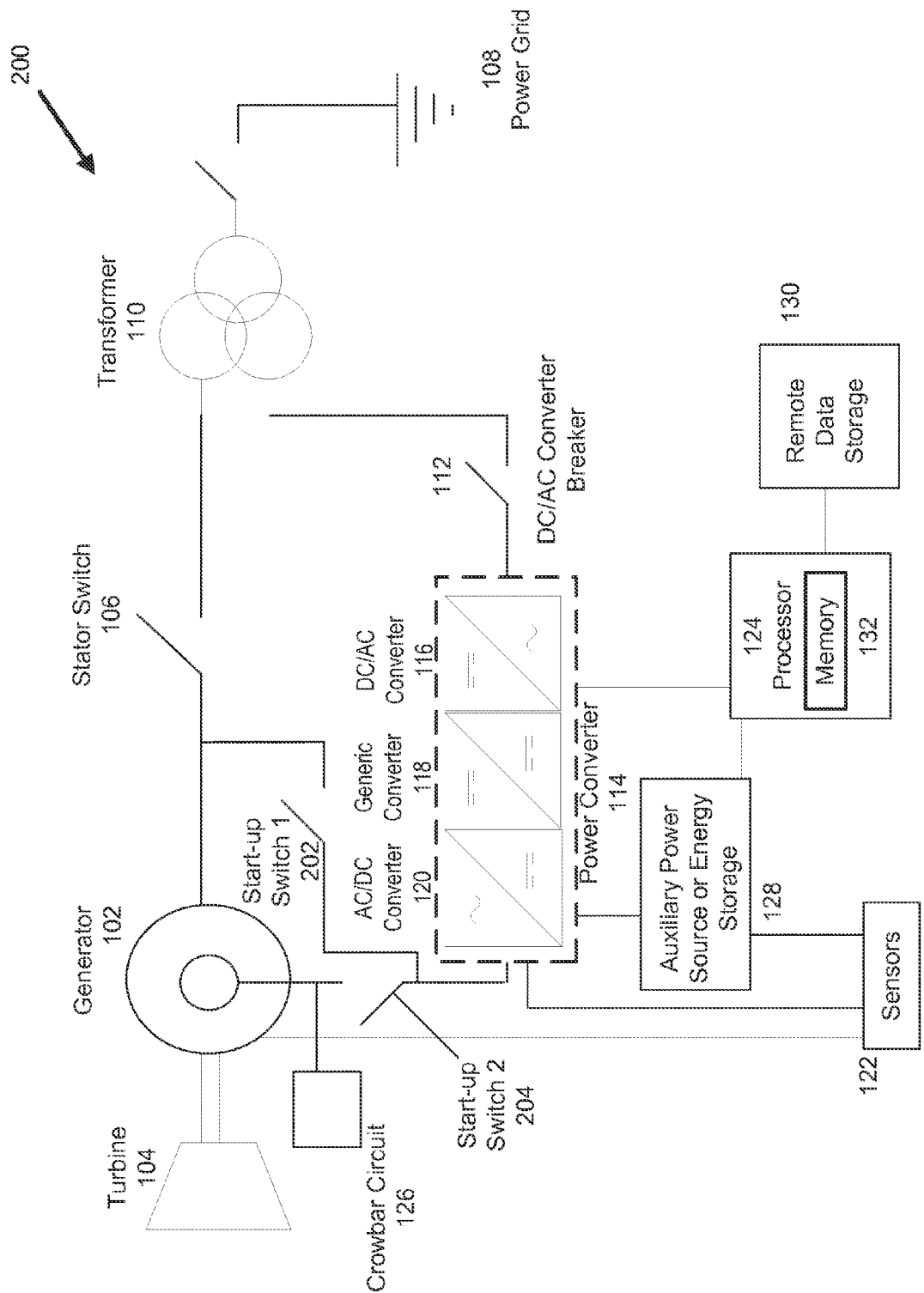
FIG. 2 is a schematic diagram of another example system according to an example embodiment.

FIG. 2 illustrates another example system according to an embodiment of FIG. 1. It is functionally identical to the system embodiment of FIG. 1, but uses a different configuration of the system components during the start-up operation. The embodiment in FIG. 2 can be used to initiate the starting mode of the combustion engine by short circuiting the rotor side of the generator 102, instead of the stator side as depicted in FIG. 1. During startup, the rotor can be short circuited by closing the crowbar circuit 126. The stator switch 106, the DC/AC converter breaker 112, and the start-up switch 2 (204), should be set in the open position while the start-up switch 1 (202) should be set to the closed position. In a normal starting mode, the converter can inject frequency variable power into the stator side to turn the generator 102 with power provided from the power grid 108. In the case of a black-start starting mode, the APU 128 can provide suitable starting power through the AC/DC converter 120 to the stator side of the generator 102.

Similar to the embodiment in FIG. 1, the system 200 of FIG. 2 can transition from the starting mode to the running mode, wherein the turbine 104 can reach a suitable firing speed and begin to mechanically turn the generator 102. Once the combustion process is initiated and the engine is in a stable combustion process, the power converter 114 can be decoupled from the generator 102 by opening the start-up switch 1 (202) and the crowbar circuit 126. The generator 102 can be prepared to send power to the transformer 110, and the voltage can be adjusted for power distribution in the power grid 108. This can be done by closing the start-up switch 2 (204), closing the stator switch 106, and coordinating the power converter 114 controls such that a relatively smooth synchronization with the grid voltage is achieved. Similar to the arrangement in FIG. 1, by injecting variable frequency AC voltage provided by the AC/DC converter 120 of the power converter 114, the generator's speed can be perturbed around its nominal speed within a tolerance range given by the maximum power rating of the power converter 114.

Figure 3:
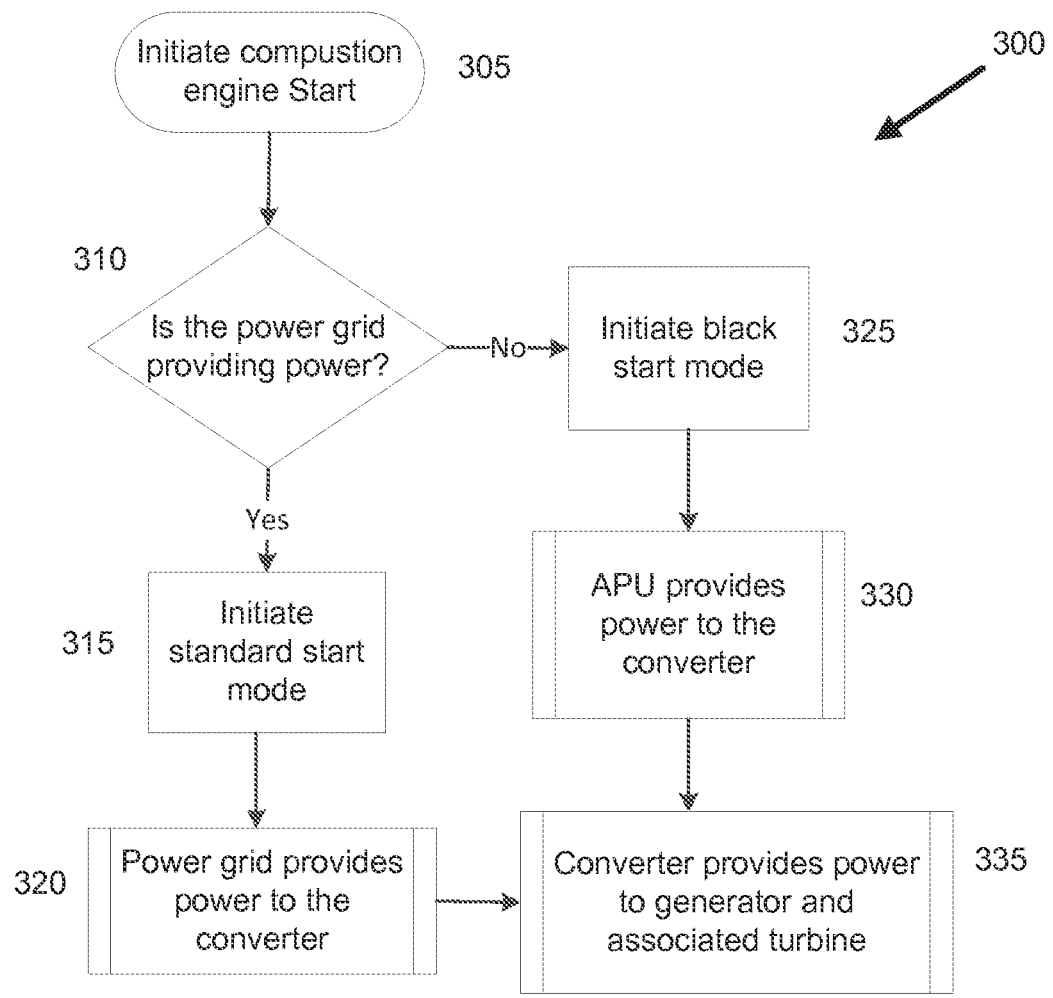
FIG. 3 is a flowchart illustrating an example method according to an example embodiment.

FIG. 3 is a flowchart representing an example method for starting a combustion engine. The example method 300 can be implemented by either or both systems 100, 200 using some or all of the system components shown in FIGS. 1 and 2. The method 300 begins in block 305, in which a combustion engine can be started. Block 305 is followed by decision block 310, in which a determination can be made whether a power grid exists to provide power. If determined that the power grid will be providing power, then the YES branch is followed, and the method 300 can continue at block 315. At block 315, a standard start mode can be initiated. At the conclusion of the standard start mode, the method 300 can continue to block 320. At block 320, a power grid can provide power to a power converter. After power has been provided to the converter, the method 300 can conclude at block 335. At block 335, the power converter can provide power to the generator and associated turbine.

Referring back to decision block 310, if the power grid is not providing power to the combustion engine, the NO branch is followed to decision block 325, in which a black-start starting mode of the combustion can be initiated. After the black-start starting mode is initiated, the method 300 can continue to block 330. At block 330, an APU can provide power to the power converter. After the APU has provided power to the power converter, method 300 can conclude at block 335. At block 335, the power converter can provide power to the generator and associated turbine.

In other example embodiments of the disclosure, the method 300 can include fewer or greater numbers of operations than those described above, and may be performed in a different sequential order than described above.

Figure 4:
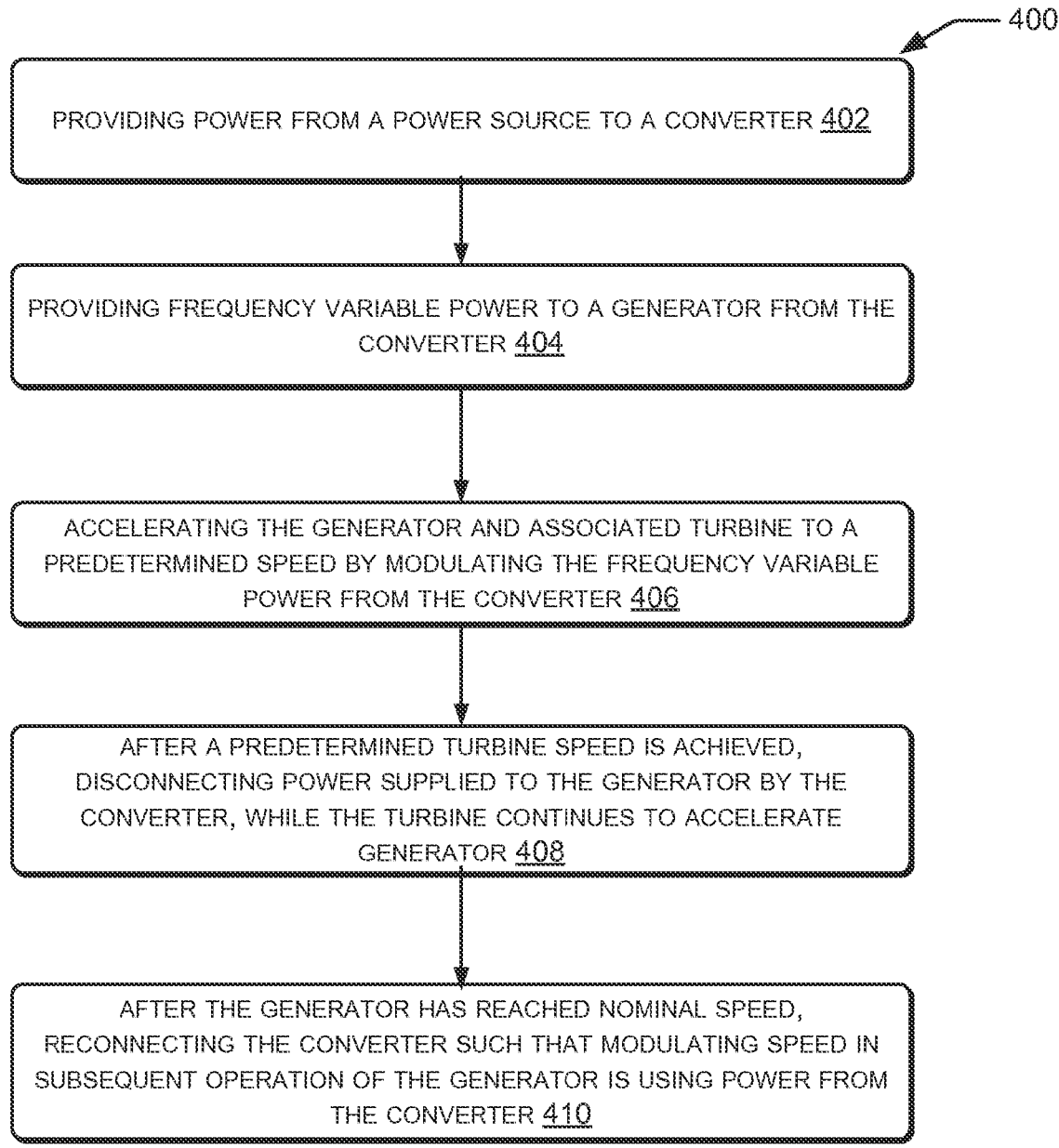
FIG. 4 is a flowchart illustrating another example method according to an example embodiment.

In FIG. 4, an example method 400 for varying the speed of a combustion engine is described with reference to a flowchart. The example method 400 can be implemented by either or both the systems 100, 200 using some or all of the system components shown in FIGS. 1 and 2. The method 400 can start in block 402, and according to an example embodiment of the disclosure, includes providing power from a power source to a converter.

In block 404, the method 400 can include providing frequency variable power to a generator from the converter. In block 406, the method 400 can include accelerating the generator and associated turbine to a predetermined speed by modulating the frequency variable power from the converter. In block 408, the method 400 can include disconnecting power supplied to the generator by the converter, after a predetermined turbine speed is achieved. The method 400 can, in certain embodiments, include running up the generator to nominal speed with power provided by the combustion engine and reconfiguring the switches into the power generation mode. In block 410, the method 400 can include reconnecting the power converter to the generator and starting power generation synchronous with the power grid. In block 410, the method 400 can include modulating subsequent operation of the generator using power from the converter.

In one embodiment, the method 400 can include charging the power source with power from the generator. In another embodiment, providing power from a power source to a converter can include providing power from an auxiliary power source or power from a power grid.

In one embodiment, providing frequency variable power to a generator from the converter can include protecting the generator and the engine from conditions outside their design boundaries and allowing operations under grid conditions known as underfrequency or overfrequency. In another embodiment, accelerating the generator and associated turbine to a predetermined speed as well as providing supplementary reactive power is automatically initiated when the power grid is close to its operating boundaries.

In one embodiment, disconnecting the power supplied to the generator by the converter can include demagnetizing the generator by removing the frequency variable power supplied by the converter. In another embodiment, modulating the subsequent operation of the generator using power from the converter can include using previously stored data and calculating generator and turbine operating efficiency from the sensor input data.

In other example embodiments of the disclosure, the method 400 can include fewer or greater numbers of operations than those described above, and may be performed in a different sequential order than described above.

References are made to block diagrams of systems, methods, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, a special purpose computer, a special purpose hardware-based computer, or other programmable data processing apparatus to produce a machine, such that the instructions which execute on the computer or other programmable data processing apparatus and create means for implementing the functionality of at least some of the blocks of the block diagrams, or combinations of the blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, main computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices through a communication network.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for variable speed operation of a combustion engine, the method comprising:
   providing power from a power source to a converter;
   providing frequency variable power to a generator from the converter;
   accelerating the generator and an associated turbine to a predetermined speed by modulating the frequency variable power from the converter;
   after a predetermined turbine speed is achieved, disconnecting power supplied to the generator by the converter, while the turbine continues to accelerate the generator; and
   after the generator has reached nominal speed, reconnecting the converter such that modulating speed in subsequent operation of the generator is using power from the converter;
   wherein the generator is protected from overvoltage using a crowbar mechanism by short-circuiting the power from the converter when the frequency variable power exceeds a predetermined value.

2. The method of claim 1, further comprising: charging the power source with power from the generator.

3. The method of claim 1, wherein providing power from the power source to the converter comprises providing power from an auxiliary power source or power from a power grid.

4. The method of claim 1, wherein providing the frequency variable power to the generator from the converter further comprises protecting the generator and the combustion engine from grid conditions outside generator design boundaries including allowing an operation at grid underfrequencies and overfrequencies.

5. The method of claim 1, wherein accelerating the generator and the associated turbine to the predetermined speed is automatically initiated when a power grid balance is insufficient.

6. The method of claim 1, wherein disconnecting the power supplied to the generator by the converter further comprises demagnetizing the generator by removing the frequency variable power supplied by the converter.

7. The method of claim 1, wherein modulating subsequent operation of the generator using power from the converter further comprises using previously stored data and calculating generator and turbine operating efficiency from sensor input data.

8. A system for variable speed operation of a combustion engine, the system comprising:
   a power source operable to provide power;
   a converter operable to receive the power from the power source and to provide frequency variable power;
   a generator operable to receive the frequency variable power from the converter, wherein the frequency variable power accelerates the generator and an associated turbine to a predetermined speed;
   wherein the converter is disconnected from the generator and the associated turbine when the predetermined speed is reached;
   a computer processor operable to modulate operation of the converter; and
   a crowbar mechanism operable to protect the generator from overvoltage by short-circuiting the power from the converter when the frequency variable power exceeds a predetermined value.

9. The system of claim 8, wherein the power source is further operable to be charged by power provided from the generator.

10. The system of claim 8, wherein the power source comprises an auxiliary power source or power provided from a power grid.

11. The system of claim 8, wherein the converter is bi-directional and can provide or receive the frequency variable power or direct current power.

12. The system of claim 8, wherein the generator operable to provide power to a power grid comprises a doubly fed induction generator.

13. The system of claim 8, wherein the crowbar mechanism comprises a physical component of the converter wherein the power provided to the generator is simultaneously regulated to prevent an overload of the generator.

14. The system of claim 8, wherein the processor is operable to automatically initiate acceleration of the generator and the associated turbine to the predetermined speed when insufficient power is available from a power grid.

15. The system of claim 8, wherein the converter is further operable to disconnect the power supplied to the generator wherein the converter demagnetizes the generator by removing the frequency variable power.

16. The system of claim 8, wherein the processor is further operable to modulate subsequent operation of the generator using the frequency variable power from the converter, and the modulating signal is generated using stored data and calculating generator and turbine operating efficiency from sensor input data.

17. One or more computer-readable media storing computer-executable instructions that, when executed by at least one processor, configure the at least one processor to perform operations comprising:
   providing power from a power source to a converter;
   providing frequency variable power to a generator from the converter;
   accelerating the generator and an associated turbine to a predetermined speed by modulating the frequency variable power from the converter;
   after the predetermined speed is achieved, disconnecting the power supplied to the generator by the converter; and
   modulating subsequent operation of the generator using power from the converter;

wherein the generator is protected from overvoltage using a crowbar mechanism by short-circuiting the power from the converter when the frequency variable power exceeds a predetermined value.

18. The one or more computer-readable media of claim 17, further comprising operations comprising:
automatically initiating an auxiliary power unit to provide power to the converter when insufficient power is supplied from a power grid.

19. The one or more computer-readable media of claim 17, further comprising operations comprising:
automatically initiating adjustments to generator speed when there is insufficient power available from a power grid.

* * * * *